United States Patent
Wang et al.

(10) Patent No.: US 8,627,021 B2
(45) Date of Patent: Jan. 7, 2014

(54) METHOD AND APPARATUS FOR LOAD-BASED PREFETCH ACCESS

(75) Inventors: Feng Wang, San Diego, CA (US); Jonghae Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 13/222,399

(22) Filed: Aug. 31, 2011

(65) Prior Publication Data
US 2013/0054853 A1 Feb. 28, 2013

(51) Int. Cl.
*G06F 12/00* (2006.01)
(52) U.S. Cl.
USPC .................... 711/154; 711/137; 710/110
(58) Field of Classification Search
USPC ................... 711/154, 137; 710/110
See application file for complete search history.

(56) References Cited

U.S. PATENT DOCUMENTS

| | | | |
|---|---|---|---|
| 5,649,231 A | 7/1997 | Kitano | |
| 6,049,891 A * | 4/2000 | Inamoto | 714/6.12 |
| 6,212,611 B1 | 4/2001 | Nizar et al. | |
| 6,496,877 B1 | 12/2002 | Greenberg et al. | |
| 6,526,462 B1 | 2/2003 | Elabd | |
| 6,611,392 B1 * | 8/2003 | Hasebe | 360/53 |
| 2002/0194441 A1 | 12/2002 | Chauvel et al. | |
| 2003/0188077 A1 * | 10/2003 | Watts et al. | 710/313 |
| 2004/0006671 A1 | 1/2004 | Handgen et al. | |
| 2005/0102560 A1 * | 5/2005 | Taketoshi et al. | 714/14 |
| 2005/0257005 A1 | 11/2005 | Jeddeloh | |
| 2006/0248237 A1 * | 11/2006 | Ido et al. | 710/6 |
| 2008/0140941 A1 * | 6/2008 | Dasgupta et al. | 711/137 |
| 2009/0132733 A1 | 5/2009 | Codrescu et al. | |
| 2009/0307691 A1 | 12/2009 | Moscibroda et al. | |
| 2011/0161587 A1 * | 6/2011 | Guthrie et al. | 711/122 |

FOREIGN PATENT DOCUMENTS

EP 0374337 A1 6/1990

OTHER PUBLICATIONS

International Search Report and Written Opinion—PCT/US2012/053559—ISA/EPO—Jan. 7, 2013.

* cited by examiner

*Primary Examiner* — Hashem Farrokh
(74) *Attorney, Agent, or Firm* — Sam Talpalatsky; Nicholas J. Pauley; Joseph Agusta

(57) ABSTRACT

A load state of a slave memory is detected and provided to a master device. The master device communicates prefetch access requests to the slave memory based, at least in part, on the detected load state. Optionally, the master device communicates prefetch requests to the slave memory according to a schedule based, at least in part, on the detected load state.

68 Claims, 7 Drawing Sheets

METHOD AND APPARATUS FOR LOAD-BASED PREFETCH ACCESS

FIELD OF DISCLOSURE

This disclosure relates to slave device access management and, more particularly, to prefetch access management.

BACKGROUND

In a conventional master-slave memory circuit having a bus system, bus masters access the memory through bus arbitration schemes that must guarantee low latency or meet bandwidth requirements. Related Art FIG. 1 shows an example 100 of such a system, having master devices 102-1, 102-2 ... 102-N (collectively 102) connected to bus masters interfacing to the bus interconnect 104. Various traffic patterns along available paths 106 may be determined by bus arbiters such as 108. One or more memories 112 couple to respective memory controllers 110, which couple to slave devices interfacing to the bus 104. In these conventional designs, efficiency of accesses to the memories 112 heavily depends on the traffic patterns determined by the bus arbiters 108, as well as address request patterns, and the design of the memory controller and memory itself Further, in conventional arrangements, memories 112 may not be fully utilized due to temporal load unbalance. During times of heavy bus utilization, for example, the bus 104 may form a process flow bottleneck that delays memory access for some access requests by the bus masters. Further, during times of light bus utilization, the memories 112 may be under-utilized, and result in memory access capacity being wasted.

FIG. 2 shows a computer simulation 200 of memory accesses to a conventional master-slave, for example the memory formed by the FIG. 1 memory 112 and its memory controller 110 in the FIG. 1 depicted bus system 100. The computer simulation 200 is over a time interval TT along a time axis 202, marked according to contiguous equally spaced sampling intervals. At each of the sampling intervals is a vertical bar, having a height representing the quantity of memory requests carried out by the above-described slave memory over that sampling interval. It will be understood that the total of the accesses over the TT interval accomplishes, in terms of an amount of data transferred, a given benchmark task. For convenience in referring to FIG. 2, periods of predominantly read requests are filled in black and periods of predominantly write requests are marked by cross-hatching.

The temporal load imbalance shown by the FIG. 2 simulation is significant. Over time intervals LT1, LT2 and LT3, the average number of read accesses per subinterval is low. Contrasting sharply, packed into the much shorter time periods HT1, HT2, and HT3 are write accesses arriving at the slave memory at a rate multiple times the read access density over LT1, LT2 and LT3. Stated differently, for approximately 90% of the TT interval used to perform the given benchmark task, the slave memory is handling only ⅕ the access density that it may be capable of handling. Further, if the access density during the HT1, HT2, and HT3 high load intervals is high enough to cause degradation in system performance then, for the small percentage of the time the memory is not severely under-utilized it is, instead, over loaded.

SUMMARY

Exemplary embodiments of the invention are directed to systems and methods providing master-slave access according to a slave load state of the slave memory.

According to one or more exemplary embodiments a method may include detecting a load state of a slave memory, and communicating a prefetch access request from a master to the slave memory in accordance with the detected load state.

In one aspect, detecting a load state of the slave memory may include generating a load state data at the slave memory and transmitting the load state data to the master device.

In another aspect an access request may include an associated access command and, according to one or more exemplary embodiments, one method may further include placing the associated access commands in a slave memory command queue for execution by the slave memory and, in one aspect, detecting the slave load state may be based, at least in part, on a quantity of access commands in the command queue.

One or more of the exemplary embodiments may include a master-slave memory apparatus having means for detecting a slave load state of a slave memory, and means for communicating a prefetch access request from the master device to the slave memory based, at least in part, on the detected slave load state.

According to one or more exemplary embodiments, a computer product may have a computer readable medium comprising instructions that, when read and executed by a processor, cause the processor to perform operations for controlling master-slave memory accessing and, in one aspect, the instructions may comprise instructions that cause a processor to detect a slave load state of a slave memory, and communicate a prefetch access request from the master device to the slave memory based, at least in part, on the detected slave load state.

According to one exemplary embodiment, a master device may receive a slave memory load data indicating the slave memory having one of a heavy load or a light load, may schedule transmission of master-slave prefetch commands to the slave memory based, at least in part, on the slave memory load indicated by the received slave load data.

As will be appreciated by persons of ordinary skill in the art from this disclosure, example benefits may include balancing of memory loading over time, reduction in memory congestion and concomitant reduction in memory latency. These and benefits, may also provide performance improvement to master devices having tight memory access latency requirements. Further benefits may include, but are not limited to, reduced power consumption resulting from an increase in a time that the memory is powered down, thus saving power.

BRIEF DESCRIPTION OF THE DRAWINGS

The accompanying drawings are presented to aid in the description of embodiments of the invention and are provided solely for illustration of the embodiments and not limitation thereof.

Related Art

DETAILED DESCRIPTION

Figure 1:
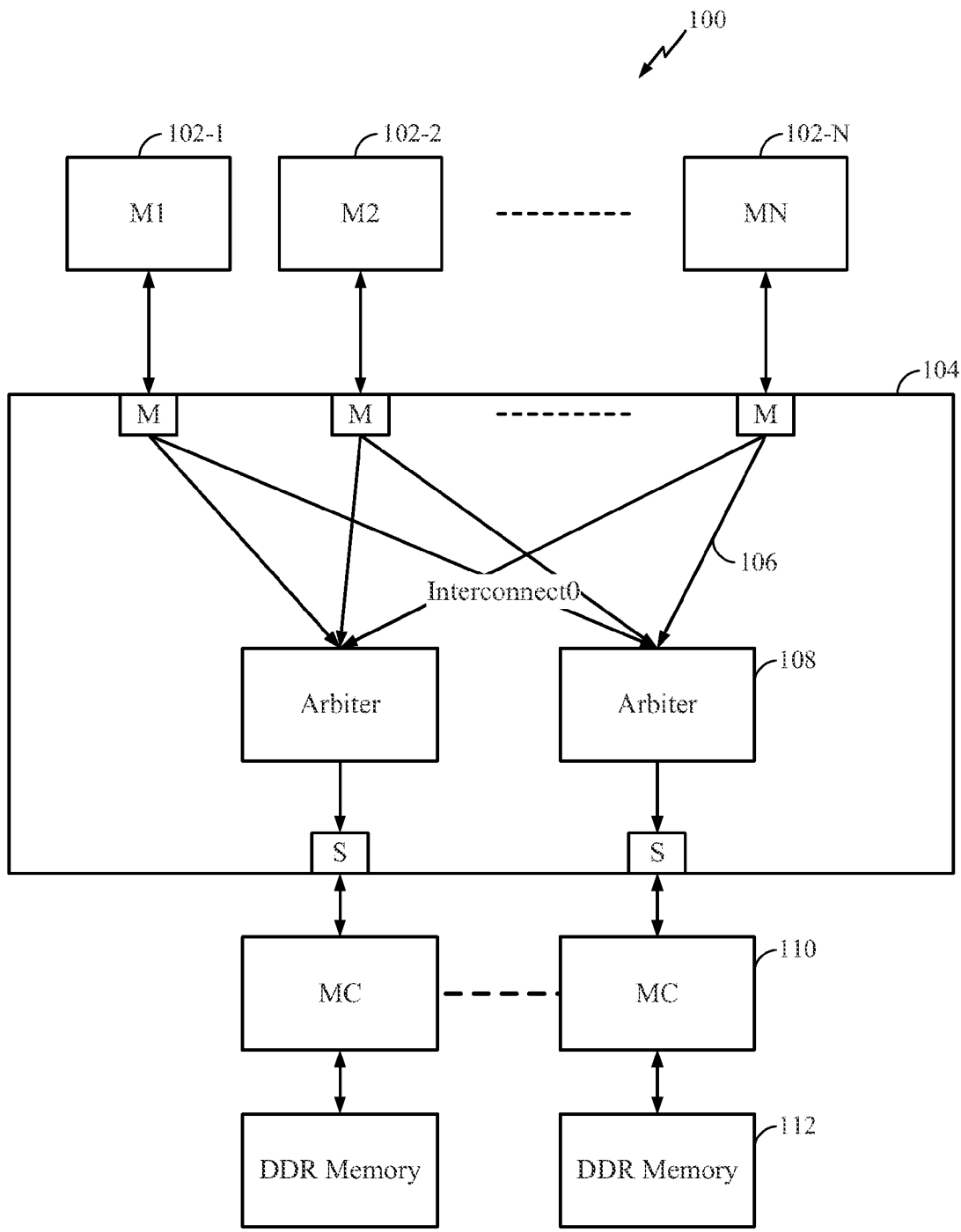
FIG. 1 shows a conventional master-slave bus memory system.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

One example embodiment includes a master device coupled to a slave memory, the slave memory having means to detect its own, i.e., slave load state and to transmit the slave load state to the master device. The master device may, in response, generate and transmit access requests to the slave device based, at least in part, on the slave load state. In one aspect, master device may schedule transmission of access requests to the slave memory based, at least in part, on the load state of the slave memory.

In one aspect the slave memory may transmit, upon its determination of having a light load state, a prefetch send request to the master device. As will be appreciated, this aspect may provide substantial load balancing over time by permitting the master devices to exploit for purposes of prefetch otherwise under-utilized memory capacity. In a corresponding aspect the slave memory may transmit to the master device, upon its determination of having a heavy load state, a prefetch postpone or delay request. In one aspect, the master device may respond to the prefetch postpone or delay request by postponing its sending of prefetch, and other high latency-tolerant access requests to the slave memory, while not postponing sending low latency-tolerant access requests.

As will be further appreciated, this aspect may provide a load more even or balanced over time by permitting the master devices to move the scheduling of prefetch access requests, which due to their high latency-tolerance can tolerate such scheduling change, for the benefit of low latency-tolerant access requests. This aspect may provide an increase in the percentage of time in which the slave memory can handle low latency-tolerant access requests.

Figure 3:
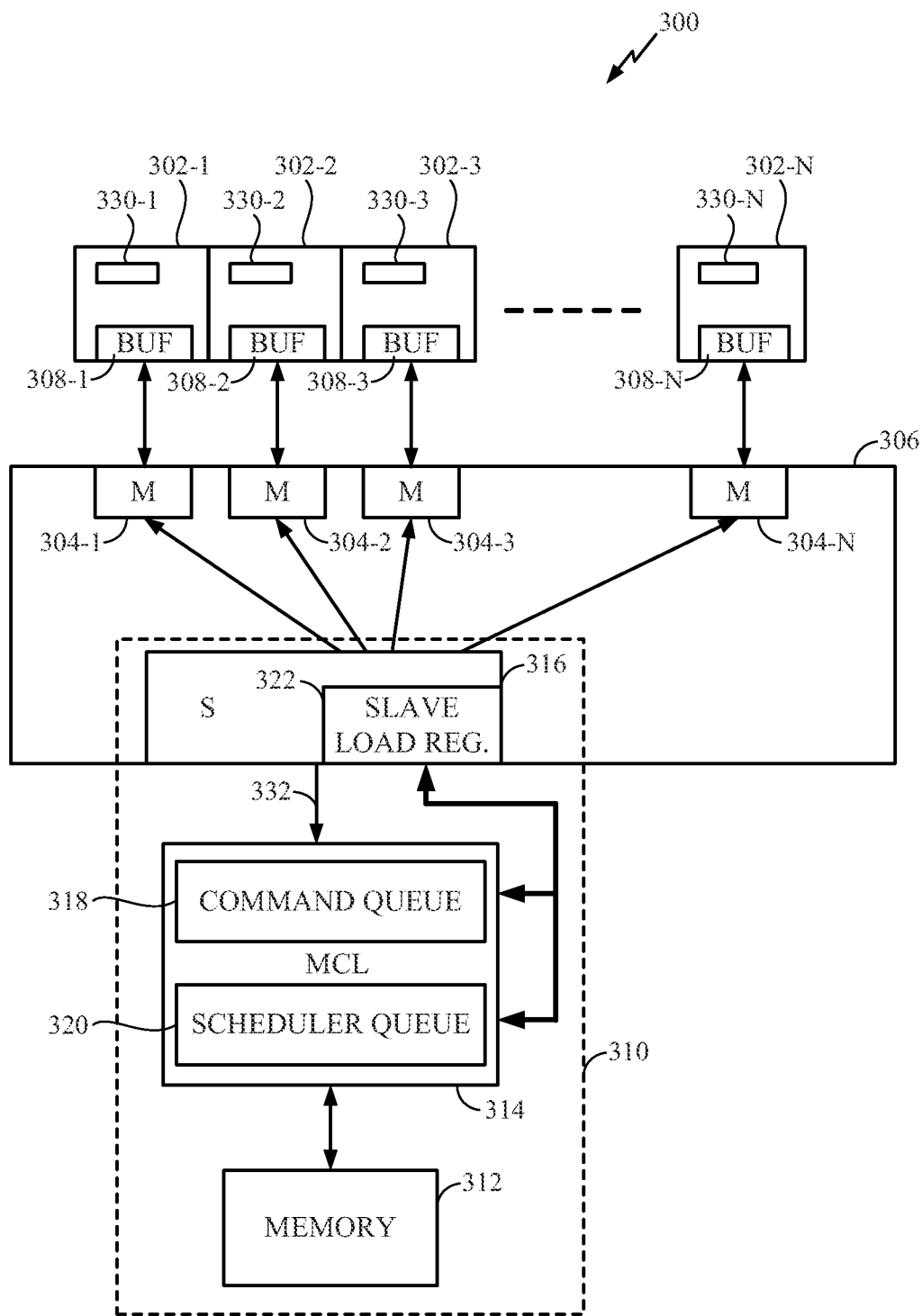
FIG. 3 shows a functional schematic of one load based prefetch system according to one exemplary embodiment.

FIG. 3 is a functional block diagram 300 of one load based prefetch access system according to one or more exemplary embodiments. The FIG. 3 functional block diagram 300 shows, in the depicted combination with other devices, a plurality of N master devices, labeled 302-1, 302-2, 302-3 . . . 302-N (generically referenced as 302), each of which may be coupled through a respective master interconnect device, labeled 304-1, 304-2, 304-3 . . . 304-N (generically references as 304), respectively, to an interconnect 306. Each of the master devices 302 may include, or have access to, a prefetch buffer such as the examples labeled 308-1, 308-2, 308-3 . . . 308-N (generically referenced as 308). With respect to the structure and control of the prefetch buffers 308, it will be understood that unless explicitly stated otherwise, these may be implemented using conventional buffer structure and control.

It will be understood that a "master device" is any device that can issue an interconnect request, and a "slave device" is any device that responds to an interconnect request. Further, the master devices 302 may be any type of processing entity, for example a microprocessor or other digital signal processor (DSP) embodied by, for example, an ASIC. Also, in the context of a master-slave prefetching, the "master device" may be any processing entity that can issue an interconnect request and is capable of executing applications or other processing tasks that involve prefetching from a slave memory to a prefetching buffer.

It will be understood that "interconnect," in the context of the interconnect 306, means logic that routes access requests, access data, and other transaction data from any of the master interconnect devices 304, to any slave interconnect device, e.g., the slave interconnect device 316 described at later sections. Any physical media may used for the interconnect 306, for example, wire, cable, optical fiber, wireless, or any combination of the same. The interconnect 306 may include, for example, point-to-point switching connections (not shown), controlled by a bus arbiter (not shown). Alternatively the interconnect 306 may include multiple direct links (not shown). Further, the interconnect 306 may include a shared bus, channel, or link. Except where otherwise explicitly stated, or where made clear from the context to be otherwise, the interconnect 306 is not necessarily particular to the embodiments.

Referring still to FIG. 3, the functional block diagram 300 shows a load based prefetch access system including a slave memory 310, which in this example is a logical block that may comprise, for example, a memory 312 coupled to a slave memory control/load detecting device (MCL) 314 that in turn may be coupled to the interconnect 306 via a slave interconnect device 316. It will be understood that the "slave memory" 310 is a functional block representing the collected functions of the MCL 314, the slave interconnect device 316, and the memory 312, as seen from the master devices 302. It will be understood that the label "slave memory" is an arbitrary term, not intended to limit the scope of structure or methods practicing the example embodiments. For example, functions of the MCL 314, the slave interconnect device 316, and the memory 312 may be implemented in a manner having a segmentation of hardware not necessarily corresponding to the FIG. 3 logical block segmentation.

It will be understood that the MCL 314 may be transparent to the master devices 302, and may be configured to carry out on the memory 312 the access requests received from the master devices 302. Examples of such carrying out of access requests by the MCL 314 include, but are not necessarily limited to, generating appropriate memory 312 control signals (e.g., read and write enable and clock pulses), presenting to the memory 312 properly timed address signals and write data, receiving read data from the memory 312 and sending that data back to the originating master device 302.

With continuing reference to FIG. 3, in accordance with one or more example embodiments the MCL 314 may include or may have access to a command queue 318 for queuing access commands within or otherwise associated with the access requests, to carry out on the memory 312. In one aspect the MCL 314 may also have a queue 320 that may, for example, contain the scheduled command.

In accordance with one or more example embodiments, one or both of the MCL 314 and the slave interconnect device 316 may be configured to detect a loading level of the MCL 314. In one aspect, one or both of the MCL 314 and the slave interconnect device 316 may be configured to detect a loading level of the MCL 314 based on a quantity of access commands waiting in the command queue 318. In another aspect, one or both of the MCL 314 and the slave interconnect device 316 may be configured to detect a loading level by, for example, detecting (not explicitly shown in FIG. 3) an average number of access requests the MCL 314 is receiving per unit time. In one aspect, one or both of the MCL 314 and the slave interconnect device 316 may be configured to generate, based on the detected load level, a corresponding load status data (hereinafter referenced by the arbitrary name "LDST").

Referring still to FIG. 3, in one aspect, one or both of the MCL 314 and the slave interconnect device 316 may be configured to maintain the LDST locally in, for example, a load status register or equivalent, such as the slave load status register 322. In another related aspect, one or both of the MCL 314 and the slave interconnect device 316 may be configured to report, for example in response to an updating of its value, the locally maintained LDST to one or more of the master devices 302. In still another aspect, one or more of the master devices 302 may be configured to query the slave memory 310 for the value of LDST it maintains locally in its slave load status register 322. For example, one or more of the master devices 302 may be configured to send a load status update instruction (not shown in FIG. 3) to the slave memory 310, in response to which the slave memory 310 may send the, for example, an updated LDST content of the slave load status register 322.

It will also be understood that the FIG. 3 functional block diagram 300 shows a single slave interconnect device 316, but this is not intended to limit the scope of any of the embodiments. For example, the depicted coupling link 332 of the slave memory 310 may encompass another interconnect (not shown) coupled by a bridge (not shown) to a slave interconnect device at the position shown for the slave interconnect device 316. In such a case, an updated LDST may be maintained anywhere from which it may be seen by the master devices 302 as being associated with the slave memory 310. As another illustration, the MCL 314 may encompass a portion of a multi-memory slave memory controller (not shown) that controls a plurality of separately addressed memory devices (not shown), one of which may be the memory 312. In such a case, a separate LDST may be maintained for each of the memory devices. Likewise, only one slave memory 310 is shown, to introduce concepts without obfuscation by details not necessary to practicing according to the exemplary embodiments. Persons of ordinary skill in the art will be able, from this disclosure, to understand the same concepts as applied to any of the master devices 302 sending access requests to any one of a plurality of slave memories (not shown) that may be connected to the interconnect 306. For example, each of a plurality of slave memories may generate and transmit to one or more of the master devices 302 its own respective LDST, using any of the various means described in reference to the slave memory 310. One or more of the master devices 302 may then store or otherwise have access to this plurality of LDSTs, and then generate, schedule and/or transmit prefetch access requests to such slave memories, based on the corresponding LDSTs, as described in reference to the example slave memory 310.

Referring still to FIG. 3, an example load based prefetch system according to the functional block diagram 300 may, in one aspect, have one or more of the master devices 302 configured to locally store or maintain an updated copy, or other indicator of the LDST. For purposes of this description, this copy or other indicator of LDST maintained in one or more of the master devices 302 will be referenced herein as "M-LDST" to distinguish, for example, from the LDST stored local in the slave load status register 322 of the slave memory 310. In one example, the master devices 302-1, 302-2, 302-3 . . . 302-N may maintain the M-LDST for the slave memory 310 in a readily accessible local register or memory location, such as the depicted slave load monitor registers 330-1, 330-2, 330-3 . . . 330-N (generically referenced as 330). It will be understood that the slave load monitor registers 330 are functional blocks, not representative of any specific hardware or any specific register allocation scheme.

With respect to updating the M-LDST stored in, for example, the slave load monitor registers 330 of the master devices 302, various structures and methods will be apparent to persons of ordinary skill in the art upon reading this disclosure. For example, a load based prefetch system as shown by the functional block diagram 300 may be configured to update M-LDST values stored in the master device 302 internal slave load monitor registers 330 based on the slave memory 310 updating the LDST in the slave load status register 322. As one further example, the slave memory 310 may be configured to detect an updating of the LDST in the slave load status register 322 by counting the number of requests in the command queue 318, and may sample this number for a particular time interval and compare the sampled number to a predetermined light load/high load value. The particular time interval, or the predetermined light load/high load value, or both, may be either programmed or fixed. In one aspect, the slave memory 310 may be configured to send to one or more of the master devices 302 a "light slave load" notification, in response to an updating of the LDST value in the slave load status register 322. In another aspect, the slave memory 310 may be configured to send an LDST updating packet (not shown in FIG. 3) to the master devices 302 regardless of the level of the LDST. Various methods and arrangements for sending such a "light slave load" notification, or sending an LDST updating packet will become apparent, based on this disclosure, to persons of ordinary skill in the art. For example, in response to a read access request from a master device 302, the MCL 314 may append the LDST to the data it reads from the memory 312 and sends back to that master device 302. The master device 302 may then update the M-LDST in its slave load monitor register 330. As another example, the MCL 314 may include the LDST in an acknowledgment it sends to an originating master device 302 when carrying out a write access request on the memory 312. These are only examples; other structures and/or processes to maintain an updated M-LDST in the slave load monitor register 330 may become apparent to persons of ordinary skill from this disclosure, or from practicing according to its exemplary embodiments.

In the FIG. 3 example load based prefetch system shown by the functional block diagram 300, according to various exemplary embodiments, one or more of the master devices 302 may be configured to generate, schedule and/or transmit prefetch access requests to the slave memory 310 based, at least in part, on the load state of the slave memory 310. In one aspect, one or more of the master devices 302 may be configured so that, when executing a thread for which prefetch access requests to the slave memory 310 are desired, the master device 302 generation or transmission of the prefetch access request is dependent, at least in part, on its locally stored M-LDST for that slave memory 310. In another aspect, one or more of the master devices 302 may be configured so that when executing a thread for which prefetch access requests to the slave memory 310 may be appropriate, the generation or transmission of the prefetch access requests is dependent, at least in part, on receiving an updated LDST from the slave memory 310 indicating a light load. In another aspect, one or more of the master devices 302 may be configured so that when executing a thread for which prefetch access requests to the slave memory 310 may be appropriate, the master device may send a request for updated LDST to the slave memory 310 and, depending on the updated LDST that the master device 302 receives, the prefetch access request may, or may not be sent.

Referring still to FIG. 3, it will be understood that the examples identified above are not intended to, and do not limit the scope of structures or methods contemplated by the exemplary embodiments by which master devices may generate, schedule and/or transmit prefetch access requests to the slave memory 310 based, at least in part, on load state. To illustrate, according to one aspect a master device 302 may be configured to generate prefetch access requests and, prior to transmission to the slave memory 310, load the prefetch access request into a queue (not shown in FIG. 3) or other buffer (not shown in FIG. 3) local to the master device. Further to this aspect, a master device 302 may be configured to make transmission of the prefetch access request, from the queue or other buffer to the slave memory 310 conditional, at least in part, on the slave load state of the slave memory.

Figure 4:
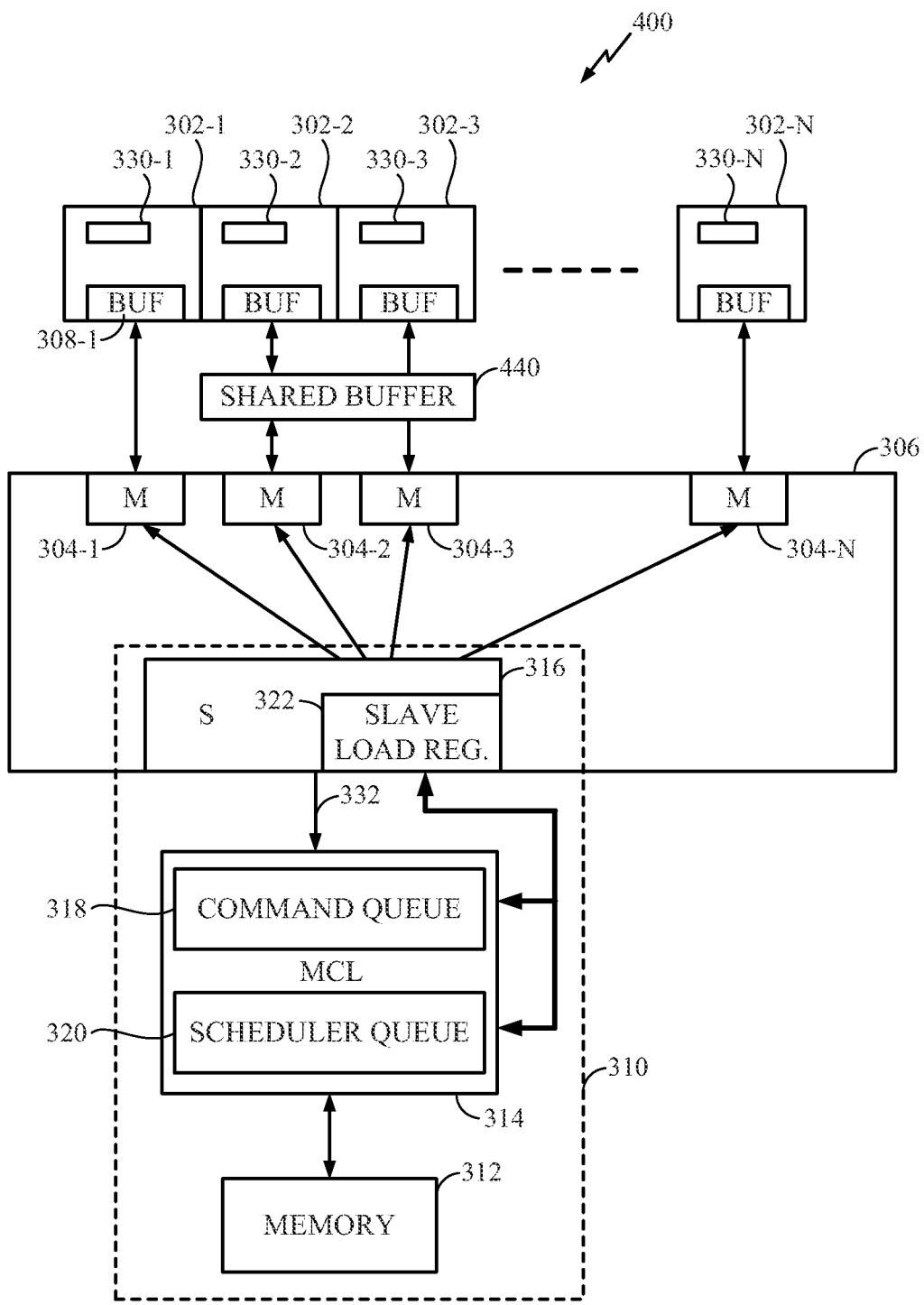
FIG. 4 shows a functional schematic of one shared buffer aspect of one load based prefetch system according to one exemplary embodiment.

It will be appreciated by persons of ordinary skill in the art that, among various other benefits and advantages provided by load-based prefetch access system or method according to the exemplary embodiments, there may be a significant decrease in prefetch latency and therefore a corresponding significant increase in prefetch performance. It will be understood by such persons that a result of this increase in prefetch performance may be that an internal buffer capacity of one or more of the master devices 302, for example of internal buffers (not explicitly shown in FIG. 3) conventionally used for prefetch buffering may become a constraint. In one aspect, to remove potential for such a constraint, a shared buffer may be used. FIG. 4 shows a functional schematic 400 of one load based prefetch system according to one exemplary embodiment that includes, as one example of such a shared buffer, the shared buffer 440. It will be understood by persons of ordinary skill in the art, from reading this disclosure, determining which of the master devices 302 may benefit from such a shared buffer 440, and determining the capacity of the shared buffer 440 will be substantially application-specific. Such persons, however, having view of this disclosure, will be readily able to configure such a shared buffer to perform in a manner commensurate with the exemplary embodiments and, therefore, further detailed description is omitted.

Figure 5:
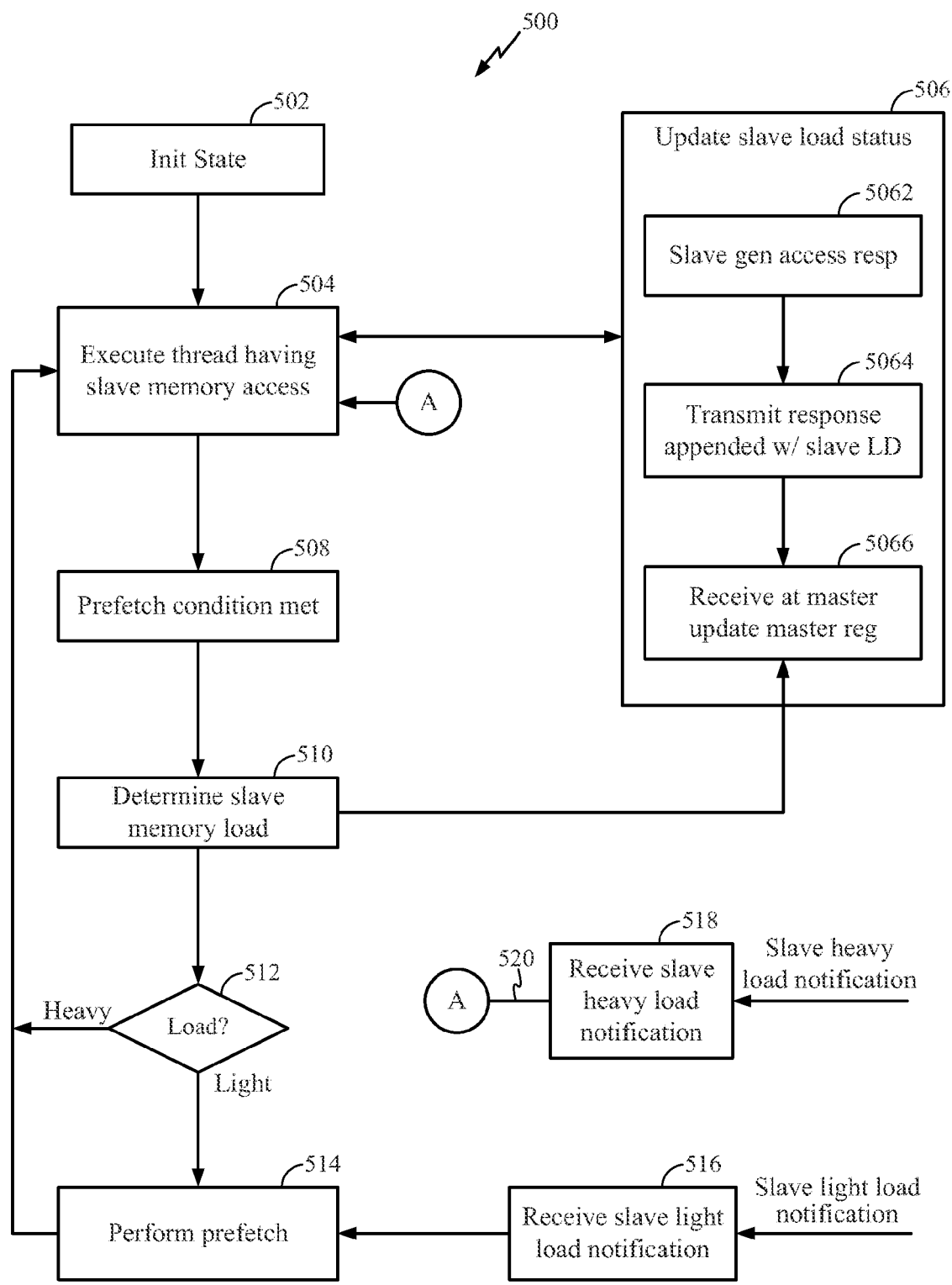
FIG. 5 is a block flow diagram of one example process for one load based prefetch request generation and transmission according to one exemplary embodiment.

FIG. 5 shows a block flow diagram 500 of one example of a master device performing one or more of a generating, scheduling or transmitting prefetch access requests, based at least in part on a slave load, in a process according to one or more exemplary embodiments. To assist in understanding concepts shown by the block flow diagram 500, example operations may be referenced to particular blocks of the FIG. 3 functional block diagram 300. It will be understood, however, that the described allocation of operations according to the block flow diagram 500 to blocks of the FIG. functional block diagram 300 describes only one example of such allocation for practicing a process as shown by the FIG. 5 block flow diagram 500, and is not intended as limiting the scope of any of the exemplary embodiments or any aspect thereof.

Referring to FIG. 5, one example process according to the FIG. 5 block flow diagram 500 may begin at an arbitrary starting state 502 that may be assumed, for purposes of example, as an idle state of a master device, e.g., a master device 302 of FIG. 3, or may be execution of a thread not pertaining to prefetch access requests. Next, for example in response to an event such as an input (not shown) at a user command interface (not shown), a process according to the block flow diagram 500 may go to 504 to execute a thread utilizing (including performing prefetch access of) a slave memory, for example the FIG. 3 slave memory 310.

Referring to FIG. 5, in one aspect a transition from the arbitrary starting state 502 to executing the thread at 504 may include initializing (not shown) the indicators of the load status of the slave device(s) with which the thread will interact, e.g., setting the FIG. 3 master device(s) 302 internal slave load monitor register 330 corresponding to the slave memory 310 to a default M-LDST, and/or setting the LDST in the slave load status register 322 to a default value. The default value of LDST and M-LDST may, for example, indicate a heavy slave load or may indicate a light slave load. In another aspect, transition from the arbitrary starting state 502 to executing the thread at 504 may include the master device sending a load status query (not shown) to the slave device(s) with which the thread will interact. For example, the FIG. 3 master device 302 may send a query to the slave interconnect device 316 to report the LDST content of the slave load status register 322, and then the master device 302 may, upon receiving the updated LDST, update the M-LDST value in its slave load monitor register 330. In another aspect, the previously described "initialization" in transitioning from the arbitrary start state 502 to executing the thread may be omitted and, instead, be performed by a first updating at 506 of the slave device's local indicator of load status and/or the master device's locally stored indicator of the slave memory load status, as described in greater detail below.

Referring still to FIG. 5, in one aspect, concurrent with executing the thread at 504 there may be at 506 one or more updates of the slave device's local indicator of load status and/or the master device's locally stored indicator of the slave memory load status. For example, referring to FIG. 3, in the course of the master device 302 sending data read requests to the slave memory 310 and receiving read data results, or the master device 302 sending data write access to the slave memory 310 and receiving write confirmation, the LDST content of the slave load status register 322 slave memory and the M-LDST content of the master device's slave load monitor register 330 may be updated. In one example slave load indicator updating at 506, according to one aspect, at 5062 the slave memory may generate a response to master device access request, for example data read from the slave memory, then goes to 5064 to transmit to the master device the response generated at 5062, appended with or otherwise including an updated value of its local slave load indicator. Continuing with the example, at 5066 the master device may receive the response having the updated slave device load status and updates the master device's locally stored slave device load status indicator.

Referring to FIG. 3, one example of the slave load indicator updating at 506 may include the slave memory 310 sending to the slave interconnect device 316 a response to a master device 302 access request, followed by the slave interconnect device 316 appending or otherwise including the LDST value from the slave load status register 322 and sending this to the master device 302. The master device 302 may then receive the response having the updated LDST, and then update the M-LDST in its slave load monitor register 330 accordingly.

Continuing with FIG. 5, in one example process according to the block flow diagram 500 at 508 a prefetch condition may be determined and met, in one aspect, on the load state of a slave device, for example the slave memory 310. Stated differently, in one aspect a prefetch may be a default or background process that monitors or otherwise detects a slave device load state and, when a given load condition is detected, a prefetch is performed. In another aspect, a prefetch access request condition may be met at 508 using a triggering or initiation of a prefetch in accordance with conventional prefetch processes, combined with configuring the actual generation and/or transmission of the prefetch access request to be dependent, entirely or in part as provided by the various aspects, on the load state of the slave memory. Further to this aspect, with respect to such conventional prefetch access request conditions that may be met at 508, conventional process(es) for generating the conditions, and type(s) of prefetch that may relate to the condition, persons of ordinary skill in the art may readily select and arrange these, in combination with the present disclosure, to practice according to the exemplary embodiments. Further detailed description of such conventional prefetching is therefore omitted.

With continuing reference to the FIG. 5 block flow diagram 500, the meeting of the prefetch condition at 508 is shown as being prior, with respect to the flow direction, to the master device determining the load status of the slave memory, which is described below in reference to blocks 510 and 512. It will be understood, though, that 508 shows only example sequence position, relative to the functions represented by blocks 510 and 512, for meeting a prefetch condition, and therefore block 508 may be placed at alternative positions within the block flow diagram 500. For example, as will be appreciated by persons of ordinary skill in the art from this disclosure, a block (not shown) representing a meeting of a prefetch condition may be placed to be dependent on the determining the load status of the slave memory.

Referring to FIG. 5, it will be assumed that in one example process according to the block flow diagram 500, the meeting of the prefetch condition at 508 may be an event associated with execution of the thread, whereupon the process may go to 510 to determine the slave load state. It will be understood that prefetch conditions or events that may embody or implement meeting a prefetch condition at 508 encompass, for example and without limitation, conventional hardware based prefetch conditions or triggers, for example a hardware logic (not shown) detecting a miss on a cache block (not shown), as well as conventional software prefetch conditions or triggers, for a example a prefetch instruction inserted in a program. As another illustration of hardware based prefetch conditions that may embody or implement meeting a prefetch condition at 508, prefetch hardware logic (not shown) may be included in, or associated with a master device, and such logic may be configured to determine the prefetch address and when to initiate the prefetch. It will be understood that these are only examples, and are not intended as any limitation on the scope of any of the exemplary embodiments, or on any aspect of any embodiment. Further, persons of ordinary skill in the art will readily understand, from reading this disclosure with the knowledge that such persons possess of the various types, objectives, selection guidelines and design tools for prefetching, and the available structures and methods for implementing such designs, how to select from among, design, implement, and use various prefetchings for practicing according to the exemplary embodiments. For this reason, it will be readily understood by such persons, further detailed description of the specific prefetching conditions that may be met at 508 is not necessary and, therefore, is omitted.

With continuing reference to FIG. 5, according to one aspect, determining the slave load state at 510 may include comparing a parameter indicative of load state against a "heavy load" threshold (not explicitly shown). Referring to FIG. 3, this determining of the slave load state at 510 may be performed by, for example, one of the master devices 302 comparing the M-LDST value in its slave load monitor register 330 to a given threshold (not shown). It will be understood that this is only one example, and that various alternative determinations of the slave load status will be apparent, from this disclosure, to persons of ordinary skill in the art. Referring still to FIG. 5, after determining the slave load process at 510, one example process according to the block flow diagram 500 may go the decision block 512. In one aspect, if the slave load status was determined at 510 as a "heavy load" state the process may, as shown by the decision block 512, return to 504 and continue executing the thread at 504 and, in one aspect, updating the slave load status at 506. If, however, the slave load status was determined at 510 as a "light load" an example process according to the block flow diagram 500, in accordance with the decision block 512, go to 514 to perform a prefetch access. It will be appreciated that execution of the prefetch access at 514 may provide a lower average latency, due to the exemplary embodiments' feature of transmitting, and executing prefetch access requests during light loading of the slave memory. It will also be appreciated that the execution of the prefetch access at 514, being conditional on the slave memory having a light load state, may provide substantial temporal balancing of the load on the slave memory. As shown by FIG. 5, in one process according to the block flow diagram 500, after performing the prefetch at 514 the process may return to executing the thread at 504 and, concurrently, updating the slave load status as shown at 506.

Referring still to FIG. 5 and its block flow diagram 500, it will be understood performing a prefetch by meeting a prefetch condition such as shown at 508, and then performing the prefetch subject to determining the slave memory is at a "light load" state, is only one example of a load-based prefetch according to the exemplary embodiments. For example, in one aspect, the slave memory may be configured to check its load status and, if a "light load" is detected, to send a "light slave load" notification to one or more master devices. As also described, in a related aspect one or more of the master devices may be configured to respond to receiving a "light slave load" notification by performing a prefetch. Referring to FIG. 5, the block flow diagram 500 shows one example of such a load-based prefetch the master device receiving at 516 a "light slave load" notification from the slave device and, in response, going to 514 and performing a prefetch. It will be understood that going from block 516 to 514 may not necessarily be unconditional and, instead, may be conditional on various factors, for example the state of execution at 504 of the thread. Such conditions and factors, though, are readily identified by persons of ordinary skill in the art, and therefore are omitted from FIG. 5.

Continuing to refer to FIG. 5, another example aspect according to the exemplary embodiments for load based prefetch access is shown by the block flow diagram 500. More particularly, as previously described, the slave memory may be configured to check its load status and, if a "heavy load" is detected, to send a "heavy slave load" notification to one or more master devices. As also described, in a related aspect one or more of the master devices may be configured to respond to receiving a "heavy slave load" notification by delaying, or postponing performing a prefetch. The block flow diagram 500 shows one example at 518 of the master device receiving a "heavy slave load" notification. In one aspect, upon receiving the "heavy slave load" notification at, for example 518, a prefetch may be delayed, cancelled, or otherwise re-scheduled. The FIG. 5 block flow diagram 500 represents by flow line 520 returning to the state 504 of executing the thread, various alternative actions such as, without limitation, delaying, canceling, or otherwise re-scheduling the prefetch.

It will be appreciated that this feature by which a slave memory may send to a master device a "heavy slave load" notification effectively provides for the slave memory to send the master device a prefetch delay or prefetch postpone request. It will also be readily understood and appreciated by persons of ordinary skill in the art that the above-described aspects of a slave device configured to send to a master device a load status notification, such as the example "light slave load" or "heavy slave load" notification described above, effectively provide a feature by which a slave memory may control a master device scheduling of prefetch access requests. Stated differently, features according to the exemplary embodiments such as the "light slave load" or "heavy slave load" notification may effectively provide for the slave memory to send "prefetch request scheduling data" to the master devices.

Figure 2:
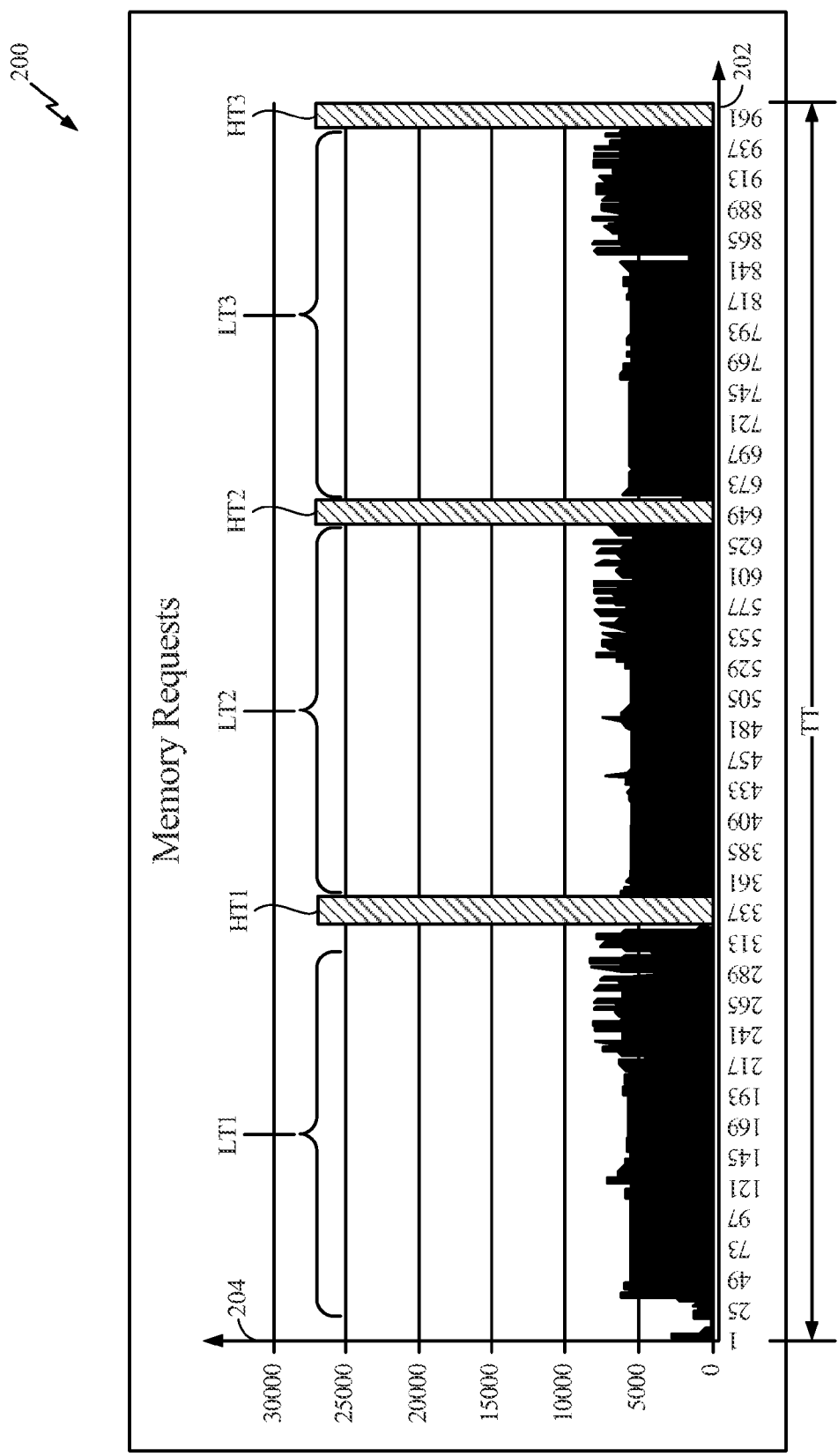
FIG. 2 is a computer simulation showing a per unit time memory access density of a slave memory of a conventional master-slave bus memory system.
Figure 6:
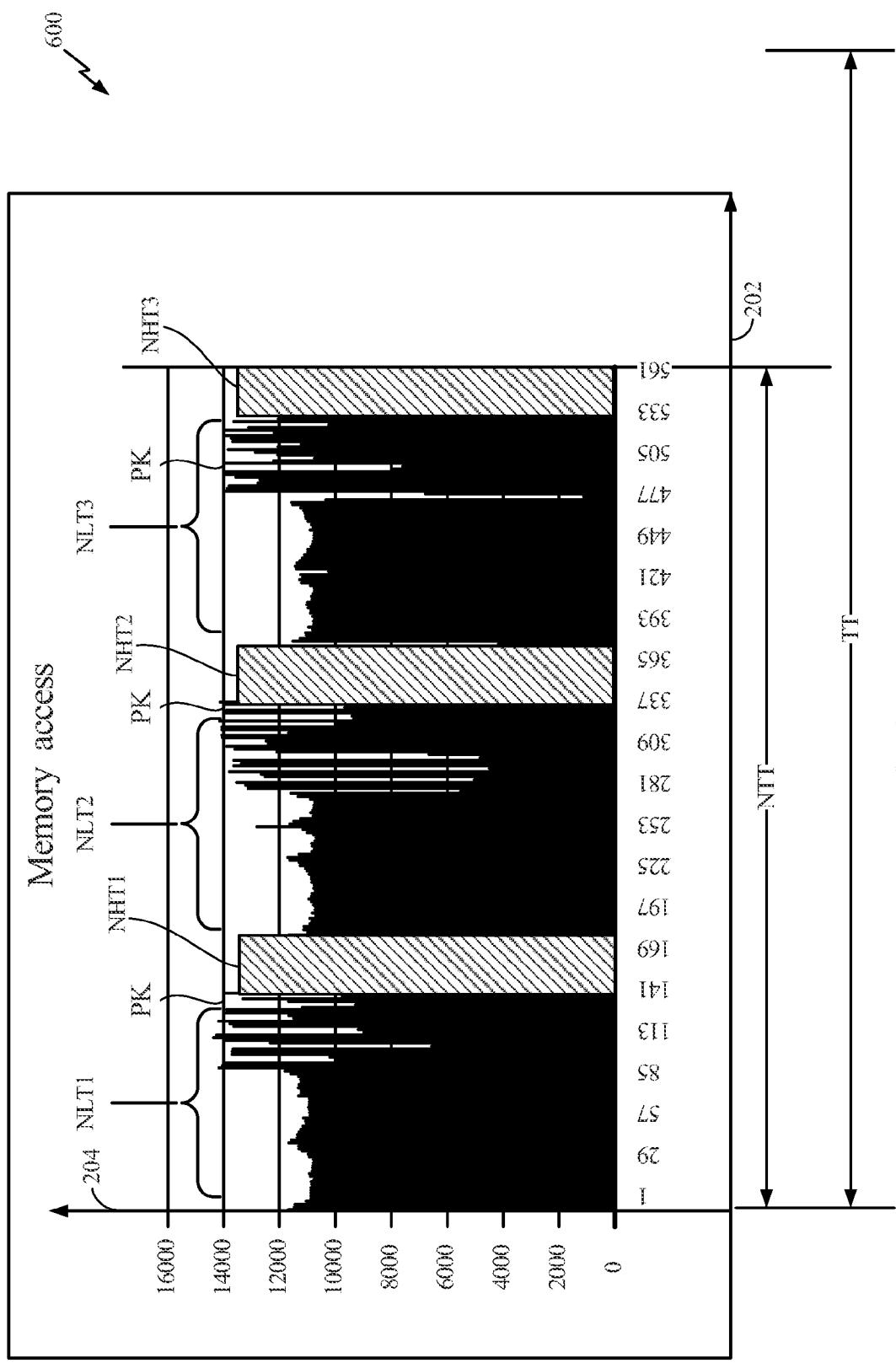
FIG. 6 shows a computer simulation of a per-unit-time interval density of receiving master device access requests at a slave memory provided by one load based prefetch access according to one exemplary embodiment.

FIG. 6 is a computer simulation showing a system of master devices 302 and a slave memory 310 as depicted at FIG. 3, operating according to methods of the exemplary embodiments. It may be assumed that the FIG. 6 computer simulation is of a method and/or apparatus according to the exemplary embodiments performing the same given benchmark task used for the FIG. 2 simulation. The periods of predominantly read accesses are, like in FIG. 2, indicated in black and the periods of predominantly write accesses are indicated cross-hatching.

It is immediately seen that the FIG. 6 access density is essentially constant, having an access density slightly higher during intervals NHT1, NHT2, and NHT3 that is approximately 13,000 accesses per sub-interval, which is only slightly greater than the approximately 11,000 average for accesses per sub-interval exhibited during the slightly lighter access density sub-intervals NLT1, NLT2 and NLT3.

Among additional benefits of load based prefetch access features of the exemplary embodiments, are seen in the FIG. 6 simulation, is an increased data transfer rate for master-slave transactions to reduce by at least one-half the time required for a given task. This is readily seen by the total interval NTT on the FIG. 6 simulation 600 for performing the benchmark task being approximately one-half the TT interval that the FIG. 2 simulation 200 of a conventional master-slave system.

It will be understood that the labeling of "master" and "slave" used in this description may be only for purposes of a given transaction. For example, it is contemplated that one or more of the master devices 302 and another device (not shown) coupled to the interconnect 306 as a slave device, may each be a microprocessor having a local memory. It is contemplated that in such an arrangement each microprocessor may be respectively configured to perform a described master slave-transaction, and each may be reconfigured to perform a reversal of their respective roles.

Figure 7:
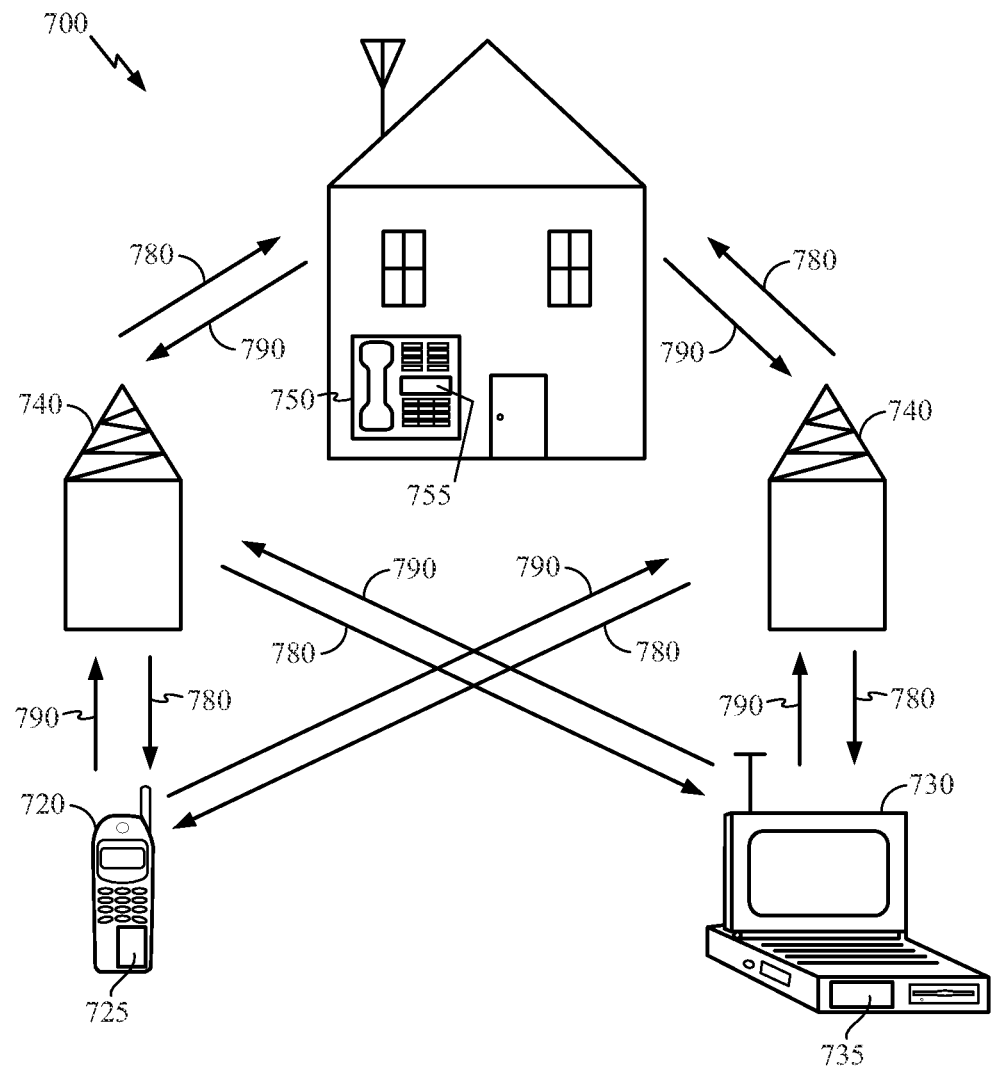
FIG. 7 illustrates an exemplary wireless communication system in which one or more embodiments of the disclosure may be advantageously employed.

FIG. 7 illustrates an exemplary wireless communication system 700 in which one or more embodiments of the disclosure may be advantageously employed. For purposes of illustration, FIG. 7 shows three remote units 720, 730, and 750 and two base stations 740. It will be recognized that conventional wireless communication systems may have many more remote units and base stations. The remote units 720, 730, and 750 include semiconductor devices 725, 735 and 755 which are among embodiments of the disclosure as discussed further below. FIG. 7 shows forward link signals 780 from the base stations 740 and the remote units 720, 730, and 750 and reverse link signals 790 from the remote units 720, 730, and 750 to the base stations 740.

In FIG. 7, the remote unit 720 is shown as a mobile telephone, the remote unit 730 is shown as a portable computer, and the remote unit 750 is shown as a fixed location remote unit in a wireless local loop system. For example, the remote units may be mobile phones, hand-held personal communication systems (PCS) units, portable data units such as personal data assistants, navigation devices (such as GPS enabled devices), set top boxes, music players, video players, entertainment units, fixed location data units such as meter reading equipment, or any other device that stores or retrieves data or computer instructions, or any combination thereof. Although FIG. 7 illustrates remote units according to the teachings of the disclosure, the disclosure is not limited to these exemplary illustrated units. The disclosed device may be suitably employed in any device which includes a semiconductor device with an on-chip voltage regulator.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for performing access request based on slave memory load. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for controlling master-slave memory accessing, comprising:
   executing a thread, wherein the executing includes a master device sending access requests through an interconnect to a slave memory;
   detecting at the slave memory, during the executing of the thread, a slave load state of the slave memory and generating a slave load status data indicating a result of the detecting;
   communicating the slave load status data from the slave memory, through the interconnect, to the master device; and
   based at least in part on the slave load status data indicating a given load condition, communicating an access request from the master device, through the interconnect, to the slave memory.

2. The method of claim 1, wherein said access request is a prefetch access request, and wherein communicating the access request includes:
   generating at the master device a prefetch access request;
   loading the prefetch request into a prefetch buffer local to the master device; and
   conditional on the slave load state indicated by the slave load status data received at the master device, transmitting the prefetch access request from the prefetch buffer, through the interconnect and to the slave memory.

3. The method of claim 1, wherein said access request is a prefetch access request, and wherein communicating the access request includes scheduling a communicating of at least one prefetch access request based, at least in part, on the slave load status data.

4. The method of claim 1, further comprising:
   communicating a read access request, associated with the thread, from the master device to the slave memory;
   retrieving at the slave memory a read result corresponding to the read access request, and communicating the read result from the slave memory, through the interconnect, to the master device,
      wherein communicating the slave load status data from the slave memory comprises communicating the slave load status data with the read result with.

5. The method of claim 1, wherein the access request is a prefetch access request, wherein detecting the slave load state includes detecting at the slave memory a heavy slave load state, and generating, as a resulting slave load status data, a heavy slave load notification, and
   wherein communicating the access request includes delaying communicating the access request in response to the master device receiving the heavy slave load notification.

6. The method of claim 1, wherein detecting the slave load state includes determining at the slave memory whether a load status meets a light load threshold, and generating, as a resulting slave load status data, a light slave load notification,
   and wherein communicating the access request includes communicating at least one prefetch access request to the slave memory in response to the master device receiving the light slave load notification.

7. The method of claim 1, wherein said access request includes an associated access command, wherein said method further comprises the slave memory placing said associated access command in a slave memory command queue for execution by the slave memory, and wherein the slave load status data is based, at least in part, on a quantity of access commands in the slave memory command queue.

8. The method of claim 1, wherein detecting the slave load state of the slave memory includes determining a quantity of access commands received at the slave memory over an interval, and generating the resulting load status data to indicate the determined quantity.

9. The method of claim 1, further comprising storing, in a slave load monitor register local to the master device, the slave load status data received from the slave memory, wherein the communicating an access request is based, at least in part, on the slave load status data stored in the slave load monitor register.

10. The method of claim 9, further comprising initializing, in association with a start of the thread, the slave load monitor register to a default value.

11. The method of claim 9, further comprising sending, in association with a start of the thread executing a thread, a load status query to the slave memory, wherein communicating the slave load status data includes the slave memory communicating the slave load status data from the slave memory to the master device in response to the slave memory receiving the slave load status query.

12. The method of claim 1, further comprising:
   storing, in a slave load status register local to the slave memory a result of detecting;
   repeating the detecting the slave state; and
   based on the repeating, updating the slave load status register with the result of the repeating.

13. The method of claim 12, further comprising sending, in association with a start of the thread, a load status query from the master device to the slave memory, wherein communicating the slave load status data includes communicating a current updated slave load status data from the slave load status register to the master device.

14. A method for controlling a scheduling, from a slave memory, a master device prefetching, comprising:
- detecting at the slave memory a load level of the slave memory;
- comparing, at the slave memory, a result of the detecting to a given load threshold;
- generating at the slave memory a prefetch scheduling data based on a result of the comparing; and
- communicating the prefetch scheduling data through an interconnect to the master device.

15. The method of claim 14, wherein the given load threshold is a given light load threshold, and wherein the detecting the light load level comprises detecting a quantity of given access commands received at the slave memory over an interval, and the generating comprises generating, in response to the comparing indicating said quantity being less than the given light load threshold, a prefetch send request as the prefetch scheduling data.

16. The method of claim 14, wherein detecting the load level comprises detecting a quantity of given access commands received at the slave memory over an interval, and the generating comprises generating, in response to the comparing indicating said quantity being greater than a given heavy load threshold, a prefetch delay request as the prefetch scheduling data.

17. The method of claim 14, further comprising:
- storing the prefetch scheduling data in a slave load status register local to the slave memory;
- repeating the detecting the slave state and, based on the repeating, updating the slave load status register with the result of the repeating;
- repeating, in association with at least one repeating the detecting, the comparing; and
- conditional upon a result of the comparing, communicating another prefetch scheduling data from the slave memory, through the interconnect, to the master device.

18. A master-slave memory apparatus, comprising:
- a master device configured to execute a thread, wherein the executing includes sending access requests to a slave memory;
- means within the slave memory for detecting, during the executing the thread, a slave load state of the memory and generating a slave load status data indicating a result of the detecting;
- means for communicating the slave load status data from the slave memory, through an interconnect, to the master device; and
- means for communicating a prefetch access request from the master device to which the slave load status data was communicated, through the interconnect, to the slave memory based, at least in part, on the slave load status data.

19. The master-slave memory apparatus of claim 18, wherein detecting the slave load state comprises detecting a heavy load state and generating as the resulting slave load status data, a heavy slave load notification, and wherein said means for communicating a prefetch access request is configured to delay the communicating in response to receiving the heavy slave load notification.

20. The master-slave memory apparatus of claim 18, wherein the apparatus is integrated in at least one semiconductor die.

21. The master-slave memory apparatus of claim 18, further comprising a unit, selected from the group consisting of a set top box, music player, video player, entertainment unit, navigation device, communications device, personal digital assistant (PDA), fixed location data unit, and a computer, into which the master-slave memory apparatus is integrated.

22. The master-slave memory apparatus of claim 18, further comprising means for sending from the master device to the slave memory a load status query,
- wherein the means for communicating the slave load status data is configured to communicate the slave load status data in response to receiving the slave load status query.

23. An apparatus for controlling a master device prefetch access request scheduling, from a slave memory, comprising:
- means for detecting at the slave memory a load level of the slave memory;
- means for comparing, at the slave memory, a result of the detecting to a given load threshold;
- means for generating at the slave memory a prefetch scheduling data based on a result of the comparing; and
- means for communicating the prefetch scheduling data through an interconnect to the master device.

24. The apparatus of claim 23, wherein the given load threshold is a given light load threshold, wherein the means for detecting the light load level is configured to detect a quantity of given access commands received at the slave memory over an interval, and wherein the means for generating a prefetch scheduling data is configured to generate, in response to the comparing indicating said quantity being less than the given light load threshold, a prefetch send request as the prefetch scheduling data.

25. The apparatus of claim 23, wherein the means for detecting the load level is configured to detect a quantity of given access commands received at the slave memory over an interval, and
- wherein the means for generating the prefetch scheduling data is configured to generate, in response to the comparing indicating said quantity being greater than a given heavy load threshold, a prefetch delay request as the prefetch scheduling data.

26. The apparatus of claim 23, wherein the apparatus is integrated in at least one semiconductor die.

27. The apparatus of claim 23, further comprising a unit, selected from group consisting of a set top box, music player, video player, entertainment unit, navigation device, communications device, personal digital assistant (PDA), fixed location data unit, and a computer, into which the apparatus is integrated.

28. The apparatus of claim 23, wherein the means for detecting the slave state is configured to repeat the detecting the slave state and, based on the repeat, update a slave load status data local to the slave memory,
- wherein the means for comparing is configured to repeat the comparing in association with at least one repeat of the detecting, and
- wherein the means for communicating the prefetch scheduling data is configured to communicate, conditional upon a result of the repeat comparing, another prefetch scheduling data from the slave memory, through the interconnect, to the master device.

29. A computer product having a non-transitory computer readable storage medium comprising instructions that, when read and executed by a processor, cause the processor to perform operations for controlling master-slave memory accessing, the instructions comprising:
- instructions that cause the processor to execute a thread, wherein the executing includes the master device sending access requests through an interconnect to a slave memory;
- instructions that cause the processor to detect at a slave memory, while executing the thread, a slave load state of the slave memory and generate a slave load status data indicating a result of the detecting;

instructions that cause the processor to communicate the slave load status data from the slave memory, through the interconnect, to the master device; and instructions that cause the processor to communicate, based at least in part on the slave load status data indicating a given load condition, an access request from the master device to which the slave load status data was communicated, through the interconnect, to the slave memory.

30. The computer product of claim 29, wherein said access request is a prefetch access request, and wherein the instructions that cause the processor to communicate the prefetch access request include instructions that cause the processor to generate a prefetch access request;

instructions that cause the processor to load the prefetch request into a prefetch buffer local to the master device; and instructions that cause the processor to transmit, conditional upon the slave load condition indicated by the load status data received at the master device, the prefetch access request from the prefetch buffer, through the interconnect and to the slave memory.

31. The computer product of claim 29, wherein said access request is a prefetch access request, and wherein the instructions that cause the processor to communicate the prefetch access request include instructions that cause the processor to schedule said communicating of the prefetch access request based, at least in part, on the detected slave load status data.

32. The computer product of claim 29, wherein the computer readable medium further comprises:

instructions that cause the processor to communicate, in association with the thread, a read access request from the master device to the slave memory; and instructions that cause the processor to retrieve from the slave memory a read result corresponding to the read access request, and to communicate the read result from the slave memory, through the interconnect, to the master device, wherein the instructions that cause the processor to communicate the read result with the load status data to the master device.

33. The computer product of claim 29, wherein the access request is a prefetch access request, wherein the instructions that cause the processor to detect the slave load state include instructions that cause the processor to detect a heavy load state and generate, as a resulting slave load status data, a heavy slave load notification, and wherein the instructions that cause the processor to communicate the prefetch access request include instructions that cause the processor to delay the communicating in response to the master device receiving the heavy slave load notification.

34. The computer product of claim 29, wherein the instructions that cause the processor to detect the slave load state include instructions that cause the processor to determine at the slave memory whether a load status meets a light load threshold and, in response said determining, to generate a light slave load notification, and wherein the instructions that cause the processor to communicate the access request include instructions that cause the processor to communicate the access request in response to receiving the light slave load notification.

35. The computer product of claim 29, wherein the non-transitory computer readable storage medium further comprises instructions that cause the processor to place an access command associated with an access request received from the master device in a command queue of the slave memory for execution by the slave memory, and to detect the slave load status based, at least in part, on a quantity of access commands in the slave memory command queue.

36. The computer program product of claim 29, wherein the non-transitory computer readable storage medium further comprises instructions that cause the processor to store, in a slave load monitor register local to the master device, the slave load status data received from the slave memory, wherein the instructions that cause processor to communicate an access request include instructions that cause the processor to communicate the access request based, at least in part, on the slave load status data stored in the slave load monitor register.

37. The computer program product of claim 36, wherein the non-transitory computer readable storage medium further comprises:

instructions that cause the processor to initialize, in association with a start of the thread, the slave load monitor register to a default value.

38. The computer program product of claim 36, wherein the non-transitory computer readable storage medium further comprises:

instructions that cause the processor to send, in association with a start of the thread, a load status query from the master device to the slave memory, wherein the instructions that cause the processor to communicate the slave load status data include instructions that cause the processor to communicate, from the slave memory to the master device, the slave load status data in response to receiving the slave load status query.

39. The computer program product of claim 29, wherein the non-transitory computer readable storage medium further comprises:

instructions that cause the processor to store a result of detecting the slave load state, in a slave load status register local to the slave memory;

instructions that cause the processor to repeat the detecting the slave state and, based on the repeat, to update the slave load status register with the result of the repeating.

40. The computer program product of claim 39 wherein the non-transitory computer readable storage medium further comprises:

instructions that cause the processor to send, in association with a start of the thread, a load status query from the master device to the slave memory, wherein the instructions that cause the processor to communicate the slave load status data from the slave memory to the master device include instructions that cause the processor to communicate, in response to the slave memory receiving the load status query, a current updated slave load status data from the slave load status register to the master device.

41. A computer product having a non-transitory computer readable storage medium comprising instructions that, when read and executed by a processor, cause the processor to perform operations for controlling a scheduling, from a slave memory, of a master device prefetching, the instructions comprising:

instructions that cause the processor to detect at the slave memory a load level of the slave memory;

instructions that cause the processor to compare, at the slave memory, a result of the detecting to a given load threshold;

instructions that cause the processor to generate at the slave memory a prefetch scheduling data based on a result of the compare; and instructions that cause the processor to communicate the prefetch scheduling data, though an interconnect, to the master device.

42. The computer product of claim 41, wherein the given load threshold is a given light load threshold, wherein the instructions that cause the processor to detect the light load level include instructions that cause the processor to detect a quantity of given access commands received at the slave memory over an interval, and wherein the instructions that cause the processor to generate include instructions that cause the processor to generate, in response to the compare indicating said quantity being less than the given light load threshold, a prefetch send request as the prefetch scheduling data.

43. The computer product of claim 41, wherein the instructions that cause the processor to detect the load level include instructions that cause the processor to detect a quantity of given access commands received at the slave memory over an interval, and to compare the quantity to the given heavy load threshold.

44. The computer program product of claim 41 wherein the non-transitory computer readable storage medium further comprises:

instructions that cause the processor to store the prefetch scheduling data in a slave load status register local to the slave memory;

instructions that cause the processor to repeat the detecting the slave state and, based on the repeat, to update the slave load status register with a result of the repeating;

instructions that cause the processor to repeat the compare, in association with at least one repeat of the detecting; and instructions that cause the processor to communicate, conditional upon a result of the comparing, another prefetch scheduling data from the slave memory, through the interconnect, to the master device.

45. A method for controlling master-slave memory accessing, comprising:

step of executing a thread at a master device, wherein the executing includes the master device sending access requests through an interconnect to a slave memory;

step of detecting at a slave memory, during the executing the thread, a slave load state of the slave memory and generating a slave load status data indicating a result of the detecting;

step of communicating the slave load status data from the slave memory, through the interconnect, to the master device; and step of communicating, based at least in part on the slave load status data indicating a given load condition, an access request from the master device to which the slave load status data was communicated, through the interconnect, to the slave memory.

46. The method of claim 45, wherein communicating the access request includes scheduling a communicating a prefetch access request based, at least in part, on the detected slave load state, wherein the method further comprises:

step of communicating a read access request, associated with the thread, from the master device to the slave memory; and step of retrieving at the slave memory a read result corresponding to the read access request, and communicating the read result from the slave memory, through the interconnect, to the master device, wherein communicating the slave load status data from the slave memory, through the interconnect, to the master device includes communicating the slave load status data with the read result with.

47. The method of claim 45, further comprising step storing, in a slave load monitor register local to the master device, the slave load status data received from the slave memory, wherein the communicating an access request is based, at least in part, on the slave load status data stored in the slave load monitor register.

48. The method of claim 47, further comprising:

step of initializing, in association with a start of the thread, the slave load monitor register to a default value.

49. The method of claim 47, further comprising:

step of sending, in association with a start of the thread, a load status query from the master device to the slave memory, wherein communicating the slave load status data includes communicating the slave load status data from the slave memory to the master device, in response to the slave memory receiving the slave load status query.

50. A method for controlling a scheduling, from a slave memory, a master device prefetching, comprising:

step of detecting at the slave memory a load level of the slave memory;

step of comparing, at the slave memory, a result of the detecting to a given load threshold;

step of generating at the slave memory a prefetch scheduling data based on a result of the comparing; and step of communicating the prefetch scheduling data through an interconnect to the master device.

51. The method of claim 50, wherein the given load threshold is a given light load threshold, wherein detecting the light load level comprises detecting a quantity of given access commands received at the slave memory over an interval, and wherein the generating comprises generating, in response to the comparing indicating said quantity being less than the given light load threshold, a prefetch request as the prefetch scheduling data.

52. A method for controlling master-slave memory accessing, comprising:

detecting a slave load state of a slave memory; and communicating an access request from a master device to the slave memory based, at least in part, on the detected slave load state, wherein said access request includes an associated access command, wherein said method further comprises placing said associated access command in a slave memory command queue for execution by the slave memory, wherein the slave load state is based, at least in part, on a quantity of access commands in the slave memory command queue, and wherein detecting the slave load state of the slave memory includes a quantity of access commands received at the slave memory over an interval.

53. A method for controlling a master device accessing of a given slave memory, comprising:

receiving at the master device a given slave load state of the given slave memory;

communicating a prefetch access request from the master device to the given slave memory based, at least in part, on the given slave load state; and detecting the load level at the slave memory, wherein the prefetch scheduling data is based on the detected load level, wherein detecting the load level comprises detecting a light load level based on a given light load threshold, and wherein generating the prefetch scheduling data generates, in response to detecting the light load level, the prefetch scheduling data at a prefetch request value.

54. The method of claim 53, wherein detecting the light load level comprises detecting a quantity of given access commands received at the slave memory over an interval, and comparing the quantity to the given light load threshold.

55. A method for controlling a master device accessing of a given slave memory, comprising:
   receiving at the master device a given slave load state of the given slave memory;
   communicating a prefetch access request from the master device to the given slave memory based, at least in part, on the given slave load state; and
   detecting the load level at the slave memory,
   wherein the prefetch scheduling data is based on the detected load level,
   wherein detecting the load level comprises detecting a heavy slave load level based on a given heavy load threshold, and
   wherein generating the prefetch scheduling data generates, in response to detecting the heavy slave load level, the prefetch scheduling data as a prefetch postpone request.

56. The method of claim 55, wherein detecting the heavy slave load level comprises detecting a quantity of given access commands received at the slave memory over an interval, and comparing the quantity to the given heavy load threshold.

57. An apparatus for controlling a master device prefetch access request scheduling, from a slave memory, comprising:
   means for generating a prefetch scheduling data based on a load level at the slave memory;
   means for communicating the prefetch scheduling data to the master device; and
   means for detecting the load level at the slave memory,
   wherein generating the prefetch scheduling data is based on the detected load level,
   wherein detecting the load level comprises detecting a light load level based on a given light load threshold, and
   wherein the means for generating a prefetch scheduling data generates, in response to detecting the light load level, the prefetch scheduling data at a prefetch request value.

58. The apparatus of claim 57, wherein detecting the light load level comprises detecting a quantity of given access commands received at the slave memory over an interval, and comparing the quantity to the given light load threshold.

59. The apparatus of claim 57, wherein the apparatus is integrated in at least one semiconductor die.

60. The apparatus of claim 57, further comprising a unit, selected from the group consisting of a set top box, music player, video player, entertainment unit, navigation device, communications device, personal digital assistant (PDA), fixed location data unit, and a computer, into which the apparatus is integrated.

61. An apparatus for controlling a master device prefetch access request scheduling, from a slave memory, comprising:
   means for generating a prefetch scheduling data based on a load level at the slave memory;
   means for communicating the prefetch scheduling data to the master device; and
   means for detecting the load level at the slave memory,
   wherein generating the prefetch scheduling data is based on the detected load level,
   wherein detecting the load level comprises detecting a heavy load level based on a given heavy load threshold, and
   wherein generating the prefetch scheduling data generates, in response to detecting the heavy load level, the prefetch scheduling data as a prefetch postpone request.

62. The apparatus of claim 61, wherein detecting the heavy load level comprises detecting a quantity of given access commands received at the slave memory over an interval, and comparing the quantity to the given heavy load threshold.

63. The apparatus of claim 61, wherein the apparatus is integrated in at least one semiconductor die.

64. The apparatus of claim 61, further comprising a unit, selected from the group consisting of a set top box, music player, video player, entertainment unit, navigation device, communications device, personal digital assistant (PDA), fixed location data unit, and a computer, into which the apparatus is integrated.

65. An apparatus for controlling a master device prefetch access request scheduling, from a slave memory, comprising:
   means for generating a prefetch scheduling data based on a load level at the slave memory;
   means for communicating the prefetch scheduling data to the master device; and
   means for detecting the load level at the slave memory,
   wherein generating the prefetch scheduling data is based on the detected load level,
   wherein detecting the load level comprises detecting a heavy load level based on a given heavy load threshold, and wherein generating the prefetch scheduling data generates, in response to detecting the heavy load level, the prefetch scheduling data as a prefetch postpone request.

66. The apparatus of claim 65, wherein detecting the heavy load level comprises detecting a quantity of given access commands received at the slave memory over an interval, and comparing the quantity to the given heavy load threshold.

67. The apparatus of claim 65, wherein the apparatus is integrated in at least one semiconductor die.

68. The apparatus of claim 65, further comprising a unit, selected from the group consisting of a set top box, music player, video player, entertainment unit, navigation device, communications device, personal digital assistant (PDA), fixed location data unit, and a computer, into which the apparatus is integrated.

* * * * *